United States Patent [19]

Sprenkle

[11] 4,287,666

[45] Sep. 8, 1981

[54] SIDE-LOADING WIRE WRAPPING ASSEMBLY FOR SEMIAUTOMATIC WIRING MACHINES

[75] Inventor: George J. Sprenkle, Phoenixville, Pa.

[73] Assignee: Burroughs Corporation, Detroit, Mich.

[21] Appl. No.: 105,381

[22] Filed: Dec. 19, 1979

[51] Int. Cl.[3] .......................... B21F 3/00; B21F 15/04; B23P 19/00

[52] U.S. Cl. ...................................... 29/753; 140/124; 242/7.17; 339/276 A

[58] Field of Search .................... 339/276 A; 140/118, 140/119, 122, 124; 242/7.06, 7.17, 7.18; 29/753, 750, 751

[56] References Cited

U.S. PATENT DOCUMENTS 2,885,764 5/1959 Shulters ............................ 29/751 X

FOREIGN PATENT DOCUMENTS 1237399 6/1971 United Kingdom .................. 29/753

*Primary Examiner*—Eugene F. Desmond

*Attorney, Agent, or Firm*—Francis A. Varallo; E. M. Chung; K. R. Peterson

[57] ABSTRACT

The present disclosure describes a side-loading wire wrapping assembly comprised of a specially configured bit and sleeve, for use on semi-automatic wiring machines. Such machines are used to make solderless wrapped connections on terminals emanating from a common plane. The wire wrapping assembly in present use on many of such machines consists of a fixed sleeve substantially enclosing a spring-loaded bit. The arrangement necessitates front-loading of the bit by the operator—a procedure which is tedious and time consuming. The present invention obviates these difficulties by converting the fixed-sleeve assembly from front-loading to side-loading. This is accomplished by providing in the sleeve, a wire feed aperture in contiguity with a longitudinal slot and of orienting the former with a widened portion of the slit formed in the bit periphery by the wire receiving bore.

6 Claims, 5 Drawing Figures

SIDE-LOADING WIRE WRAPPING ASSEMBLY FOR SEMIAUTOMATIC WIRING MACHINES

CROSS REFERENCE TO RELATED APPLICATION

To the extent that patent application Ser. No. 970,759, entitled "Wire Wrapping Bit for Semi-Automatic Wiring Machines", by George J. Sprenkle, now U.S. Pat. No. 4,195,400, issued Apr. 1, 1980 teaches an improved side-loading wire wrapping bit configuration, it is referenced herein. Both the reference application and the present one, are assigned to a common assignee.

BACKGROUND OF THE INVENTION

Wire wrapping machines and guns for attaching interconnection wiring to terminals arranged on a panel or board by solderless wrapped connections are well known in the electronics art. Such machines, while automated to position the wire wrapping bit relative to a selected terminal, require the service of an operator in inserting the wire to be wrapped into the bit for each connection to be made. If in an actual embodiment, the connection panel has a high terminal density, for example, terminals spaced on 0.10 inch centers, it will be appreciated that interconnect wire of very small diameter, such as No. 30 gauge must be used. The wrapping bit is cylindrical and contains a bore to receive the wire to be wrapped. The central or terminal aperture of the bit accommodates the terminal during wrapping. Typically, in the above-mentioned embodiment, the terminal cross section is 0.025 inches square.

Two types of semi-automatic machines involve different wiring gun operations. In the first type, a side-loading wrapping assembly is provided in the gun wherein the sleeve is automatically retracted during loading, thereby exposing the outer surface of the cylindrical bit. In the aforementioned referenced application, there is described and claimed an improved wire holding slot configuration in the bit surface to facilitate both the loading and positioning of the wire to be wrapped. After loading, the sleeve automatically closes over the bit, and both components remain in the same position relative to each other throughout the wrapping cycle.

In contrast to the foregoing, a second type of machine involves a gun wrapping assembly wherein a fixed sleeve encloses a spring-loaded retractable bit throughout the loading and wrapping operation. In this case, the bit is normally front loaded. Since the wire feed opening in the bit is very small, being approximately only one third the diameter of the terminal aperture, it is a tedious task to insert the fine wire into the feed opening, while avoiding the terminal aperture. Thus far, it has been assumed that the operator is able to see the feed opening. However, in many cases, such as with numerical positioning systems, the gun mounting is fixed and the gun is pointed away from the operator, making the front-loading of the gun extremely difficult.

The present invention is directed to this second type of machine, providing in effect, the advantages of a side-loading capability in a fixed-sleeve wiring assembly.

SUMMARY OF THE INVENTION

In accordance with the present invention, an improved wire wrapping assembly is provided for use on wiring equipment which utilizes a fixed sleeve encompassing a retracting spring-loaded wrapping tool or bit. The mounting of the new assembly on present day machines is readily accomplished since it is an exact replacement for the old assembly.

It is believed that the design of the new assembly may be better appreciated in the light of the front-loading assembly in present use. The latter comprises a cylindrical bit enclosed by a sleeve. The bit includes a central terminal receiving aperture and a pair of contiguous longitudinally disposed sections for receiving the wire to be wrapped. The first section extending from the bit face a predetermined depth is a bore having its central longitudinal axis offset from that of the bit. The diameter of the bore is chosen to accommodate the insulated portion of the wire to be wrapped and is such that it forms a longitudinal slit in the bit surface. The second section provides a slot or groove in the bit surface of substantially rectangular cross section. The groove is in substantial longitudinal alignment with the aforementioned slit and has a similar width dimension.

A sleeve completely encloses the bit. At least one semi-circular notch is provided in the free end of the sleeve adjacent the first section of the bit to initially hold the wire in position as the wrap is being formed.

The present invention modifies the front-loading assembly to render it side-loading. Thus, commencing with the notch region at the end of the sleeve, a longitudinal V-groove is formed in the sleeve such that the sides of the "V" intersect with the slit formed in the bit by the wire receiving bore. At a predetermined distance from the end of the sleeve, the V-groove terminates in a wire feed hole formed in the sleeve. The latter hole penetrates the sleeve surface at an acute angle as viewed from the free end of the sleeve with respect to a longitudinal center line. This angled configuration facilitates the insertion of the end of the wire to be wrapped. Further, the portion of the bit normally visible through the wire feed hole in the sleeve, namely the material on opposite sides of the slit, is removed preferably to a depth that permits the maximum bore opening to be visible and accessible. This further facilitates the placement of the wire within the bit by an operator.

Other features and advantages of the side-loading capability of the present invention over the previous front-loading arrangement will become apparent in the detailed description of the invention appearing hereinafter.

DESCRIPTION OF THE PREFERRED EMBODIMENT

Figure 1:
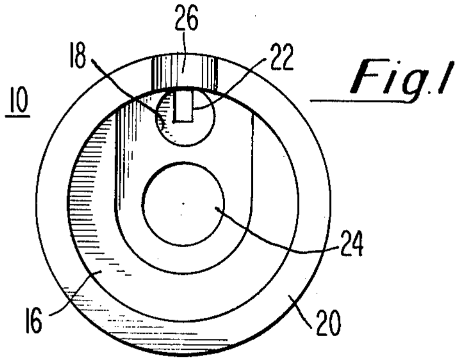
Fig.1 PRIOR ART
FIG. 1 is an end view of the front-loading wire wrapping assembly in current use.

FIG. 1 illustrates the end view of a wire wrapping assembly 10 in current use, which is designed to be front loaded by an operator. With general reference to FIG. 1 and specific reference to FIG. 3 where indicated, it is believed helpful to review briefly the wire wrapping operation of a typical semi-automatic machine. It should be understood however, that such operational details are presented solely for purposes of example and are not to be considered limitative of the invention.

Figure 3:
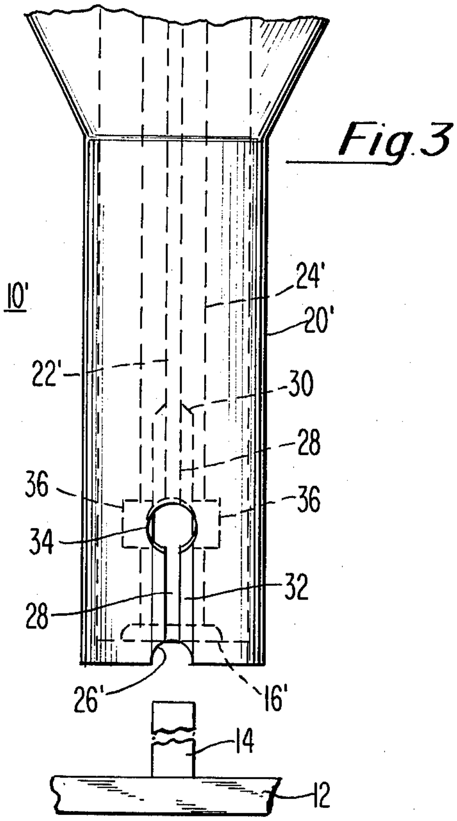
FIG. 3 is a plan view of the wire wrapping assembly of FIG. 2 shown disposed in relation to a panel having a terminal to be wrapped.

The panel 12 containing the terminals 14 (as seen in FIG. 3) to be wrapped is positioned on a stationary horizontal table (not shown). A movable boom-like carriage containing the hand operated wrap gun is assumed to be located above the table, and is positioned by a tape controller (not shown) to align the wrapping assembly 10 with the proper terminal. At this time, an insulated wire having a stripped end portion is inserted by the operator into the end of wire receiving bore 18 in wrap bit 16. The latter bit is spring loaded for back force within a stationary sleeve 20. The end of bore 18 is downward toward the panel 12 and is not visible to the operator. When the wire is fully in place within the bit 16, the stripped portion thereof occupies groove 22 and the insulated portion, bore 18. The operator then lowers the wrap gun over terminal 14—the latter entering the terminal receiving aperture 24 in bit 16. Simultaneously, the operator orients the portion of the wire external to that disposed within the wrap bit 16, at right angles to the longitudinal axis of the bit and holds it within notch 26 in the end of sleeve 20. The operator then triggers the gun to make the wrap termination. It should be noted that only the bit 16 rotates and retracts within the sleeve 20 as the termination is made. The controller is then activated to position the carriage for the next termination.

Figure 2:
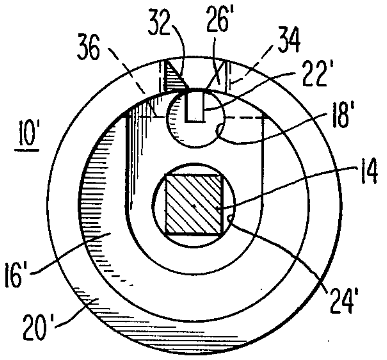
FIG. 2 is an end view of the side-loading wire wrapping assembly in accordance with the present invention.

FIGS. 2 and 3 illustrate a wire wrapping assembly 10′ in accordance with the present invention. Thus, assembly 10′ is interchangeable with and replaces the afore-described assembly 10. The primary feature of assembly 10′ is its side-loading capability and its attendant attractiveness from the standpoint of operator efficiency.

With reference to FIGS. 2 and 3, the assembly 10′ comprises a cylindrical wrap bit 16′ enclosed in a stationary sleeve 20′. The bit 16′ includes a central terminal receiving aperture 24′ and a pair of contiguous longitudinally disposed sections for receiving the wire to be wrapped. The first section extending from the free end of the bit 16′ a predetermined depth is a bore 18′ having its central longitudinal axis offset from that of the bit 16′. The diameter of bore 18′ is such that it will accommodate the insulated portion of the wire to be wrapped and is such that it forms a narrow longitudinal slit 28 in the bit surface. The sloped surface 30 at the far extremity of bore 18′ serves as a wire insulation stop. The second section provides a slot or groove 22′ in the bit surface of substantially rectangular cross section. The groove 22′ is in substantial longitudinal alignment with slot 28 and has substantially the same width.

Sleeve 20′ encloses bit 16′. At least one semi-circular notch 26′ is provided in the free end of sleeve 20′ adjacent the entrance to bore 18′. It should be noted that the wire wrapping gun is assumed to have an integral wrapping-bit positioning feature which stops the bit rotation at the same predetermined location after each wrap. Thus, wire receiving bore 18′ in bit 16′ appears opposite notch 26′ in sleeve 20′ for each wire loading operation.

Commencing with notch 26′, a longitudinal V-groove 32 is formed in the sleeve 20′ such that the sides of the "V" intersect with slit 28. The V-groove 32 terminates in a wire feed hole 34 formed in the sleeve 20′. The opening in the sleeve 20′ represented by the longitudinal dimension from the free end of the bit 16′ to the far edge of the wire feed hole 34 is chosen to be less than the height of a finished wire termination. Thus, at no time during the termination operation will the dimension of the last mentioned opening be greater than the length of wire in the bit being wrapped and the wire will be prevented from exiting therethrough. Hole 34 penetrates the sleeve surface at an acute angle, for example, 30 degrees, with respect to a longitudinal center line as viewed from the free end of the bit 16′. The bit material on opposite sides of slit 28, which would normally be visible therethrough, has been ground away as indicated by the dashed rectangles 36 to a depth that permits the maximum accessibility and visibility to the internal surface of bore 18′.

Figure 4:
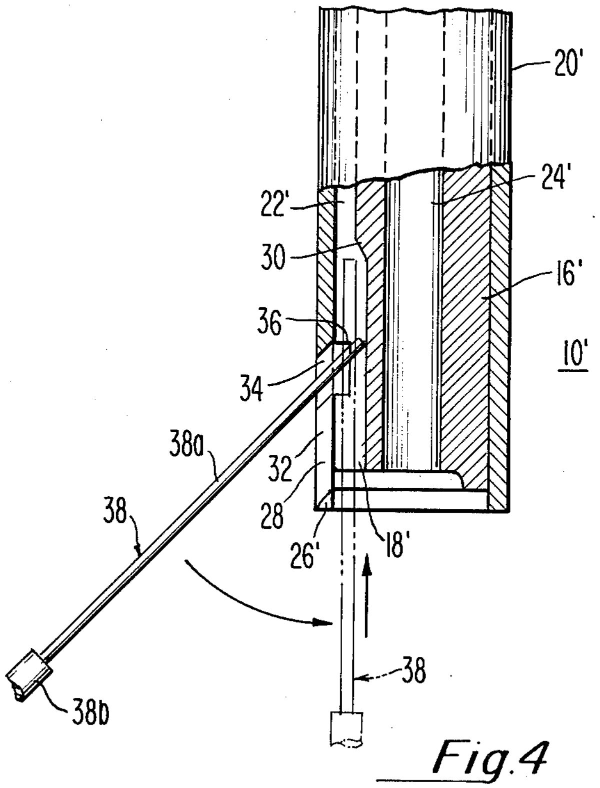
FIG. 4 is a pictorial illustration depicting the initial step of inserting the end of the stripped wire through the wire feed hole in the sleeve and of orienting it with respect to the wire receiving bore of the bit.
Figure 5:
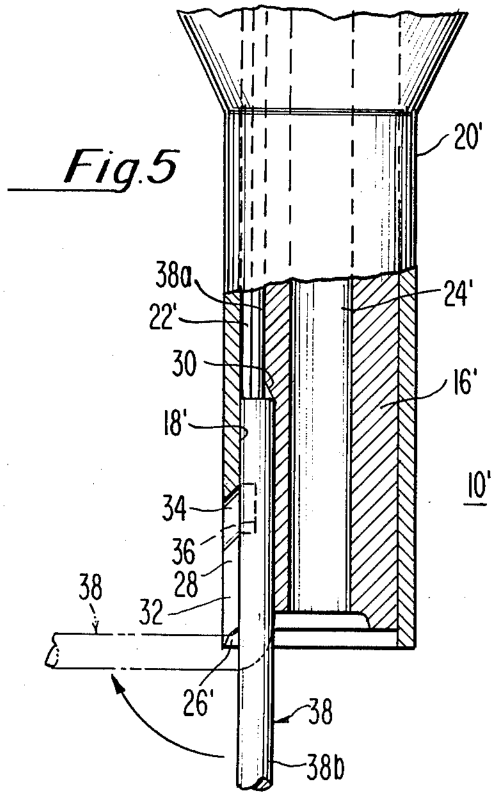
FIG. 5 illustrates the final steps of positioning the wire fully within the bit and arranging it for the commencement of the wrapping operation.

FIGS. 4 and 5 illustrate the steps performed by the operator in loading the wire wrapping bit 16′ just prior to the wrapping operation.

In FIG. 4, the operator has first inserted the stripped portion 38*a* of wire 38 through the wire feed hole 34 in sleeve 20′ into bore 18′ in bit 16′, the latter action being facilitated by the widening of slit 28 below hole 34, as indicated by the cross section of rectangular notch 36. Having gained entrance to bore 18′, the operator then passes wire portion 38*a* through slit 28 and orients the wire 38 parallel to the longitudinal axis of the bore 18′ of wire wrapping assembly 10′.

In FIG. 5, the operator has pushed the wire 38 into the bore 18′ until the insulated portion 38*b* thereof contacts the sloped surface 30 at the far extremity of bore 18′, the latter surface serving as an insulation stop. The stripped portion 38*a* of the wire 38 now rests within groove 22′. At this point, the operator bends the external portion of the wire 38 until it resides within notch 26′ of sleeve 20′ and is substantially orthogonal to the longitudinal axis of assembly 10′. As noted hereinbefore, the notch 26′ restrains the wire as the wrap termination is initiated. The wrapping assembly 10′ is now fully operational, and a wire termination may be made.

In conclusion, it should be noted that although the previous description outlines a specific design of wire wrapping assembly, the basic principles taught herein may be applied to other similar wrap mechanisms which differ somewhat in construction or operation. It is further submitted that the wire wrapping assembly of the present invention offers a substantial operational improvement over the assembly it is designed to replace. Changes and modifications of the present assembly may be needed to suit particular requirements. Such variations as are within the skill of the designer, and which do not depart from the true scope and spirit of the invention are intended to be covered by the following claims.

What is claimed is:

1. A side-loading wire wrapping assembly for use in a wiring machine comprising:

a generally cylindrical wrapping bit having at its free end a central aperture for receiving a terminal upon which a wire is to be wrapped and a pair of contiguous longitudinally disposed sections for receiving said wire prior to the wrapping operation, a first of said sections having a bore whose central longitudinal axis is offset from that of said wrapping bit, said bore extending from said free end of said wrapping bit a predetermined distance, the diameter of said bore being such that a longitudinal slit leading into said bore is formed in the bit surface, the second of said sections having a groove in said bit surface which is in substantial longitudinal alignment with said slit, a stationary sleeve substantially enclosing said wrapping bit, said sleeve having a longitudinal V-groove formed in its surface such that the sides of the "V" intersect the respective edges of the slit formed in said bit surface by said bore, a wire feed hole formed in said sleeve, said V-groove extending from the end of said sleeve adjacent said free end of said wrapping bit and terminating in said wire feed hole, the center of said wire feed hole lying along the central longitudinal axis of said V-groove, the portion of said wrapping bit appearing adjacent said wire feed hole during the loading of said wire into said wrapping bit having formed therein an opening substantially wider than said slit to provide maximum access to the interior of said bore from said wire feed hole.

2. A wire wrapping assembly as defined in claim 1 further characterized in that said wire feed hole penetrates said sleeve at an acute angle as viewed from said free end of said wrapping bit and measured from the longitudinal center line of the latter, the angled configuration of said wire feed hole facilitating the initial insertion of said wire into said wrapping bit by an operator.

3. A wire wrapping assembly as defined in claim 2 further including a semi-circular notch in the end of said sleeve adjacent said free end of said wrapping bit and adjacent said bore.

4. A wire wrapping assembly as defined in claim 3 further characterized in that the extremity of the bore contiguous with said groove includes a sloped surface which serves as a wire insulation stop.

5. A wire wrapping assembly as defined in claim 4 further characterized in that the opening in said sleeve provided by the combined longitudinal dimensions of said V-groove and the diameter of said wire feed hole is less than the height of a finished wire termination on said terminal.

6. A wire wrapping assembly as defined in claim 5 further characterized in that said wire to be wrapped includes respective stripped and insulated portions, the width of said slit being such as to permit the stripped portion of said wire to enter said bore during an initial step of the loading sequence, the dimensions of said groove and said bore being such as to accommodate respectively said stripped and insulated portions of said wire in a final step of said loading sequence prior to the wrapping operation.

* * * * *